(12) United States Patent
Bakhsh et al.

(10) Patent No.: US 7,350,804 B2
(45) Date of Patent: Apr. 1, 2008

(54) INFLATABLE VEHICLE OCCUPANT PROTECTION DEVICE WITH THORAX PROTECTION

(75) Inventors: Ali Emam Bakhsh, Rochester Hills, MI (US); Ayad G. Nayef, Sterling Heights, MI (US); John A. LaFond, Waterford, MI (US); John D. Vaughn, Riverview, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 367 days.

(21) Appl. No.: 10/983,867

(22) Filed: Nov. 8, 2004

(65) Prior Publication Data

US 2006/0097492 A1 May 11, 2006

(51) Int. Cl.
*B60R 21/16* (2006.01)
(52) U.S. Cl. .................................. 280/730.2
(58) Field of Classification Search ............... 280/729, 280/730.2, 739, 749
See application file for complete search history.

(56) References Cited

U.S. PATENT DOCUMENTS

| | | | | |
|---|---|---|---|---|
| 5,480,181 | A * | 1/1996 | Bark et al. ............... | 280/730.2 |
| 5,588,672 | A * | 12/1996 | Karlow et al. ........... | 280/730.2 |
| 5,921,576 | A | 7/1999 | Sinnhuber | |
| 6,042,141 | A * | 3/2000 | Welch et al. ............. | 280/729 |
| 6,095,551 | A * | 8/2000 | O'Docherty ............. | 280/730.2 |
| 6,152,481 | A * | 11/2000 | Webber et al. .......... | 280/730.2 |
| 6,276,712 | B1 * | 8/2001 | Welch et al. ............. | 280/730.2 |
| 6,338,498 | B1 * | 1/2002 | Niederman et al. ...... | 280/728.2 |
| 6,394,487 | B1 * | 5/2002 | Heudorfer et al. ........ | 280/729 |
| 6,481,743 | B1 * | 11/2002 | Tobe et al. ............... | 280/728.2 |
| 6,508,487 | B2 * | 1/2003 | Koster ..................... | 280/730.2 |
| 6,543,804 | B2 * | 4/2003 | Fischer ................... | 280/730.2 |
| 6,631,921 | B1 * | 10/2003 | Drossler et al. ......... | 280/730.2 |
| 6,666,475 | B2 | 12/2003 | Kippschull | |

(Continued)

FOREIGN PATENT DOCUMENTS

DE 4307175 A1 * 9/1993

(Continued)

OTHER PUBLICATIONS

Translation of EP 1227014 A2 (Ritter).*

(Continued)

*Primary Examiner*—Faye M. Fleming
(74) *Attorney, Agent, or Firm*—Tarolli, Sundheim, Covell & Tummino LLP (57) ABSTRACT

An apparatus (10) helps protect an occupant of a vehicle (12) that has a side structure (16) and a roof (18). The apparatus (10) includes a first portion (80) including at least one inflatable chamber (114). The first portion (80) is inflatable away from the vehicle roof (18) between the side structure (16) of the vehicle (12) and a vehicle occupant (20). The apparatus (10) also includes a second portion (100, 102) that includes at least one inflatable chamber. The second portion (100, 102) is inflatable away from the vehicle roof (18) between the side structure (16) of the vehicle (12) and a vehicle occupant (20). The second portion (100, 102) when inflated extends below the first portion (80) and adjacent a thorax (152) of a vehicle occupant (20) when inflated. Fluid communication between the chambers of the first portion (80) and second portion (100, 102) is substantially blocked.

31 Claims, 7 Drawing Sheets

U.S. PATENT DOCUMENTS

| | | |
|---|---|---|
| 6,676,154 B2 * | 1/2004 | Fischer ................. 280/729 |
| 6,793,240 B2 * | 9/2004 | Daines et al. ............ 280/729 |
| 6,802,530 B2 * | 10/2004 | Wipasuramonton et al. ................. 280/730.2 |
| 2003/0132619 A1 * | 7/2003 | Winarto et al. .......... 280/730.2 |
| 2003/0178831 A1 | 9/2003 | Roberts et al. |
| 2003/0184060 A1 * | 10/2003 | Smith et al. ............ 280/730.2 |
| 2003/0230877 A1 | 12/2003 | Kim et al. |
| 2004/0075257 A1 | 4/2004 | Ogawa et al. |
| 2004/0113402 A1 | 6/2004 | Bossecker et al. |
| 2004/0119270 A1 | 6/2004 | Gu et al. |
| 2004/0212179 A1 * | 10/2004 | Aoki et al. ............ 280/730.2 |
| 2005/0006882 A1 * | 1/2005 | Wang ..................... 280/730.2 |
| 2005/0082797 A1 * | 4/2005 | Welford et al. .......... 280/730.2 |
| 2005/0184492 A1 * | 8/2005 | Shilliday et al. ......... 280/730.2 |

FOREIGN PATENT DOCUMENTS

| | | |
|---|---|---|
| EP | 1227014 A2 * | 7/2002 |

OTHER PUBLICATIONS

Co-pending U.S. Appl. No. 10/787,985, filed Feb. 26, 2004 entitled "Inflatable Curtain with Extension Portion".

Co-pending U.S. Appl. No. 10/742,491, filed Dec. 19, 2003 entitled "Inflatable Curtain".

* cited by examiner

INFLATABLE VEHICLE OCCUPANT PROTECTION DEVICE WITH THORAX PROTECTION

FIELD OF THE INVENTION

The present invention relates to an inflatable apparatus for helping to protect a vehicle occupant in the event of a side impact to the vehicle and/or a vehicle rollover.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain. Inflatable curtains inflate away from the roof of the vehicle downward inside the passenger compartment between a vehicle occupant and the side structure of the vehicle in the event of a side impact, a rollover, or both. A known inflatable curtain is inflated from a deflated condition by inflation fluid directed to the inflatable curtain from an inflator.

SUMMARY OF THE INVENTION

The present invention relates to an apparatus for helping to protect an occupant of a vehicle that has a side structure and a roof. The apparatus includes a first portion including at least one inflatable chamber. The first portion is inflatable away from the vehicle roof between the side structure of the vehicle and a vehicle occupant. The apparatus also includes a second portion that includes at least one inflatable chamber. The second portion is inflatable away from the vehicle roof between the side structure of the vehicle and a vehicle occupant. The second portion when inflated extends below the first portion and adjacent a thorax of a vehicle occupant when inflated. Fluid communication between the chambers of the first portion and second portion is substantially blocked.

The present invention also relates to an apparatus for helping to protect an occupant of a vehicle that has a side structure and a roof. The apparatus includes an inflatable curtain that is inflatable away from the vehicle roof to a deployed position between the side structure of the vehicle and a vehicle occupant. The apparatus also includes an inflation fluid source for inflating the inflatable curtain. The inflatable curtain includes a thorax portion inflatable adjacent a thorax of the vehicle occupant. The thorax portion when inflated extends below remaining portions of the inflatable curtain. The thorax portion is inflatable more rapidly than other portions of the inflatable curtain.

The present invention further relates to an apparatus for helping to protect an occupant of a vehicle that has a side structure and a roof. The apparatus includes an inflatable curtain including at least one inflatable chamber. The inflatable curtain is inflatable away from the vehicle roof between the side structure of the vehicle and a vehicle occupant. The apparatus also includes an air bag including at least one inflatable chamber. The air bag is inflatable away from the vehicle roof to a position between the side structure of the vehicle and a vehicle occupant and overlying the inflatable curtain.

The present invention further relates to an apparatus for helping to protect an occupant of a vehicle during a side impact to the vehicle and during a vehicle rollover. The vehicle has a side structure and a roof. The apparatus includes a first portion actuatable away from the vehicle roof and between the side structure of the vehicle and a vehicle occupant. The first portion helps protect the vehicle occupant for at least five seconds during a vehicle rollover. The apparatus also includes a second portion for helping to protect an occupant in a vehicle side impact. The second portion includes at least one inflatable chamber and is inflatable away from the vehicle roof between the side structure of the vehicle and a vehicle occupant. The second portion when inflated extends adjacent a thorax of a vehicle occupant. The second portion is inflated and deflated within one second.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

Figure 1:
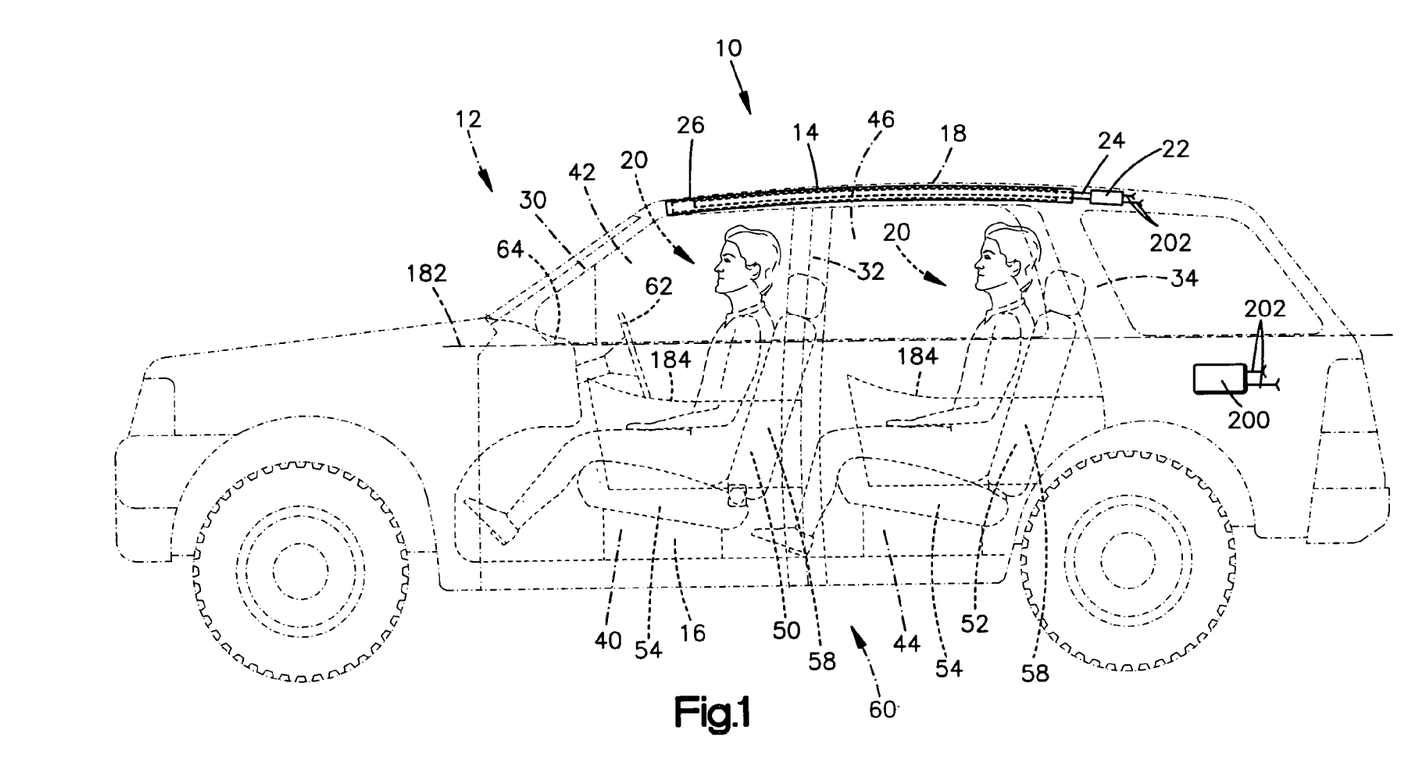
FIG. 1 is a schematic view of an apparatus for helping to protect a vehicle occupant illustrating the apparatus in a deflated condition in a vehicle, according to a first embodiment of the present invention.
Figure 2:
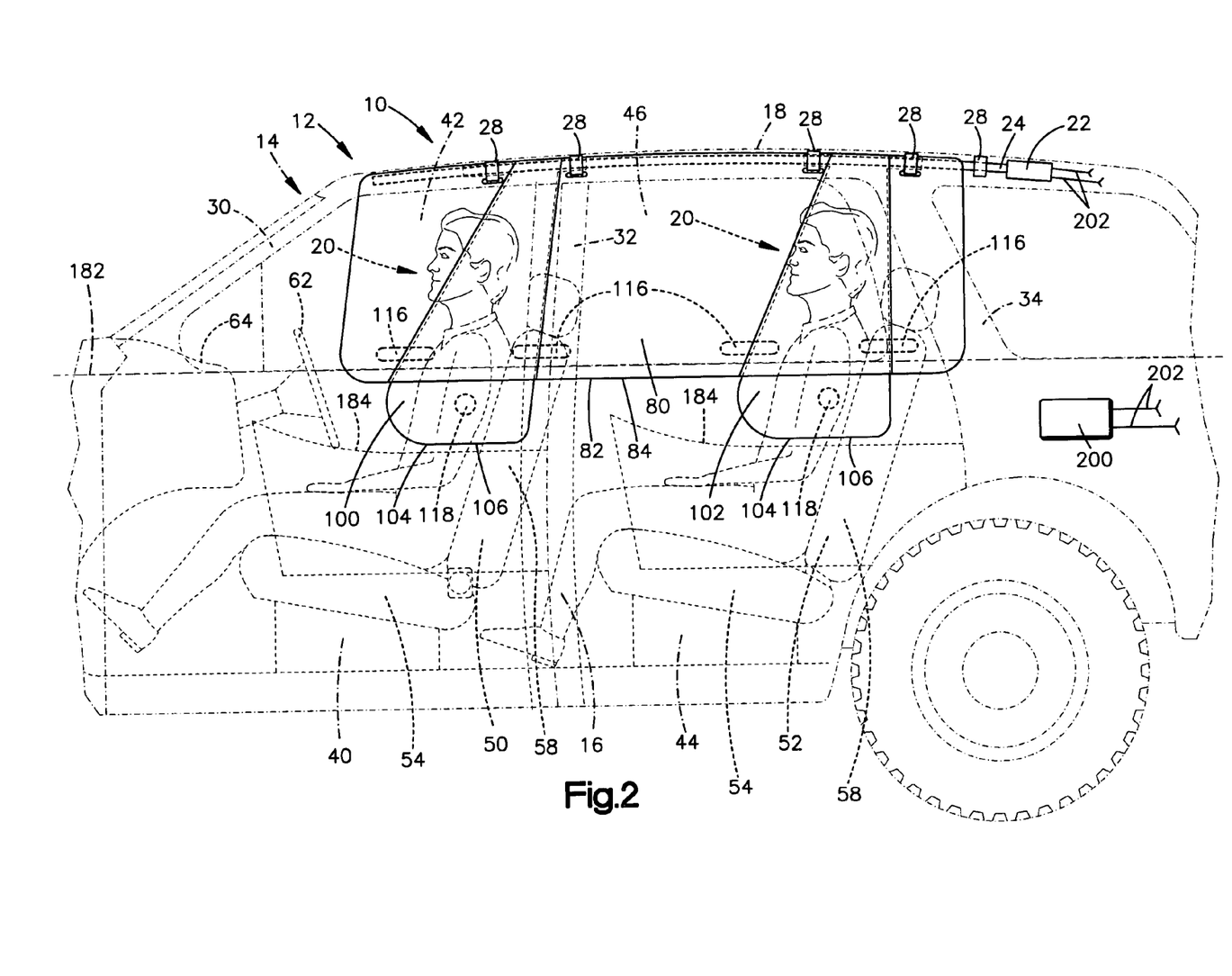
FIG. 2 is a schematic view of the apparatus of FIG. 1 in an inflated condition in the vehicle.

Referring to FIGS. 1 and 2, representative of the present invention, an apparatus 10 helps to protect occupants 20 of a vehicle 12. FIGS. 1 and 2 illustrate the apparatus 10 configured to help protect occupants 20 of first and second row seats in the vehicle 12. Those skilled in the art, however, will appreciate that the apparatus 10 may have alternative configurations. For example, the apparatus 10 may be configured to help protect occupants of any combination of rows of seating in the vehicle 12, such as a single row or more than two rows.

The vehicle 12 includes a side structure 16 and a roof 18. The side structure 16 includes an A pillar 30, a B pillar 32, and a C pillar 34. The side structure 16 also includes a front side door 40 with a front side window 42 and a rear side door 44 with a rear side window 46. The vehicle 12 also includes a front seat 50 positioned adjacent the front side door 40 and side window 42. The vehicle 12 further includes a rear seat 52 positioned adjacent the rear side door 44 and side window 46.

FIGS. 1 and 2 illustrate a driver side 60 of the vehicle 12 and thus show a steering wheel 62 positioned between the occupant 20 of the front seat 50 and an instrument panel 64 of the vehicle. It will be appreciated that the vehicle 12 would include a passenger side (not shown), configured similarly, with the steering wheel 62 and other operator controls omitted.

As best shown in FIG. 2, the apparatus 10 includes an inflatable vehicle occupant protection device 14 in the form of an inflatable curtain 80, a front air bag 100, and a rear air bag 102. In the embodiment illustrated in FIGS. 1 and 2, the inflatable vehicle occupant protection device 14 helps protect the occupants 20 of the front and rear seats 50 and 52. In this embodiment, there is a single inflatable curtain 80 and individual air bags 100 and 102 for helping to protect both the front and rear seat occupants 20. The inflatable vehicle occupant protection device 14 could, however, have alternative configurations. For example, the protection device 14 could include an inflatable curtain and air bag for helping to protect an occupant of a single row of vehicle seating. Such a protection device could thus be used to help protect an occupant of any row of seating in the vehicle, such as a first, second, or third row.

The apparatus 10 also includes an inflation fluid source, such as an inflator 22, for providing inflation fluid for inflating the inflatable vehicle occupant protection device 14, i.e., the inflatable curtain 80 and the air bags 100 and 102. The inflator 22 is connected in fluid communication with the inflatable curtain 80 and air bags 100 and 102 by a fill tube 24 that has respective portions located in the curtain and air bags. The apparatus 10 may also include a housing 26 (FIG. 1) that houses the inflatable curtain 80 and air bags 100 and 102 in a stored condition. The housing 26, inflatable curtain 80, air bags 100 and 102, inflator 22 and fill tube 24 may be assembled together and installed in the vehicle 12 as a unit.

The inflator 22 contains a stored quantity of pressurized inflation fluid (not shown) in the form of a gas for inflating the inflatable curtain 80 and air bags 100 and 102. The inflator 22 alternatively could contain a combination of pressurized inflation fluid and ignitable material for heating the inflation fluid, or could be a pyrotechnic inflator that uses the combustion of gas-generating material to generate inflation fluid. As a further alternative, the inflator 22 could be of any suitable type or construction for supplying a medium for inflating the inflatable curtain 80 and air bags 100 and 102.

The inflatable curtain 80 may have a variety of constructions. For example, the inflatable curtain 80 may include overlying panels of material interconnected at a perimeter connection 82 (FIG. 2) that extends along a periphery 84 of the inflatable curtain to help define an inflatable volume of the curtain. The inflatable curtain 80 may also include interior connections (not shown) in which the overlying panels are interconnected within the periphery 84 to define inflatable chambers of the curtain. The inflatable curtain 80 may be formed in a variety of manners, such as by weaving the overlying panels as a single piece of material, stitching the panels together, or interconnecting the panels via ultrasonic welding, heat bonding, or adhesives.

The air bags 100 and 102 may be constructed in a manner similar or identical to that by which the inflatable curtain 80 is constructed. For example, the air bags 100 and 102 may include overlying panels of material interconnected at a perimeter connection 104 that extends along a periphery 106 of the air bags to help define inflatable volumes of the air bags. The air bags 100 and 102 may also include interior connections (not shown) that help define inflatable chambers of the air bags. The air bags 100 and 102 may be formed in a variety of manners, such as by weaving the overlying panels as a single piece of material, stitching the panels together, or interconnecting the panels via ultrasonic welding, heat bonding, or adhesives.

The inflatable curtain 80 and air bags 100 and 102 can be constructed of any suitable material, such as nylon (e.g., woven nylon 6-6 yarns). The inflatable curtain 80, air bags 100 and 102, or any combination thereof may be uncoated, coated with a material, such as a gas impermeable urethane, or laminated with a material, such as a gas impermeable film. The inflatable curtain 80, air bags 100 and 102, or any combination thereof thus may have a gas-tight or substantially gas-tight construction. Those skilled in the art will appreciate that alternative materials, such as polyester yarn, and alternatives coatings, such as silicone, may also be used to construct the inflatable curtain 80 and air bags 100 and 102.

Figure 3A:
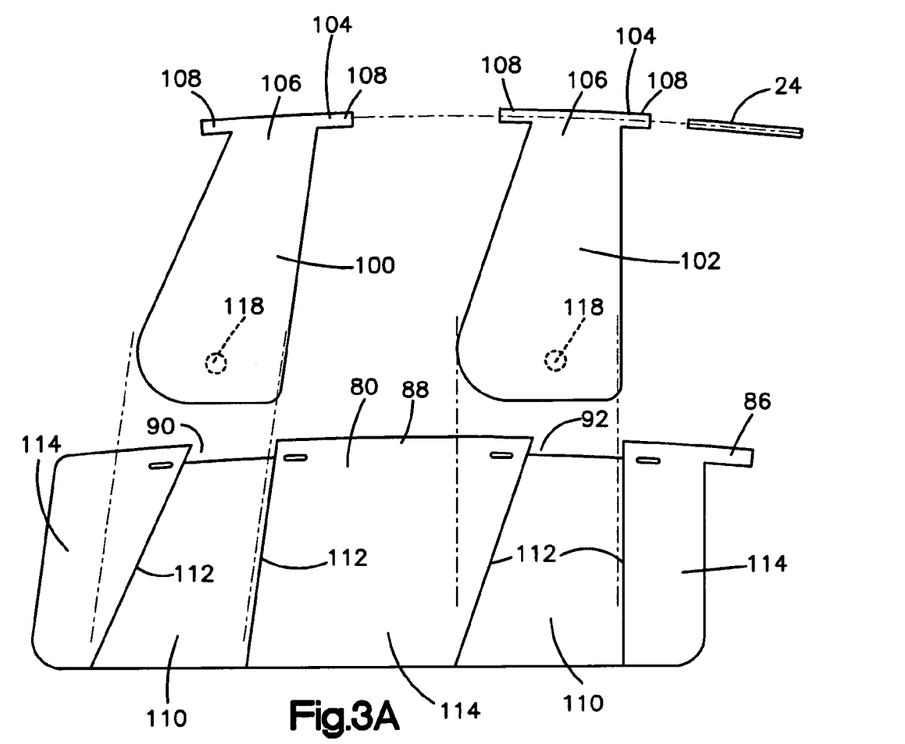
FIG. 3A is an exploded view of a portion of the apparatus of FIGS. 1 and 2.

Referring to FIG. 3A, the inflatable curtain 80 and air bags 100 and 102 are configured to be connected in fluid communication with the fill tube 24. The inflatable curtain 80 includes a channel or sleeve 86 through which the fill tube 24 may be inserted to extend along an upper edge portion 88 of the curtain. The inflatable curtain 80 also includes front and rear cutout portions 90 and 92 spaced along the upper edge portion 88. The front and rear cutout portions 90 and 92 are spaced and sized to coincide with the location of the front and rear air bags 100 and 102.

The air bags 100 and 102 both include a channel or sleeve 104 for directing the fill tube 24 along upper edge portions 106 of the air bags. The sleeves 104 may include end portions 108 that protrude from opposite ends of the air bags 100 and 102. The sleeves 104 of the air bags 100 and 102 are receivable in the cutout portions 90 and 92 of the inflatable curtain 80.

The fill tube 24 is insertable into the sleeve 86 of the inflatable curtain 80 along the upper edge 88 of the curtain. When the fill tube 24 reaches the rear cutout portion 90, the tube is directed into the sleeve 104 of the rear air bag 102. The fill tube 24 is directed along the upper edge 106 of the rear air bag 102 and back into the inflatable curtain 80 along the upper edge 88 between the front and rear cutout portions 90 and 92. When the fill tube 24 reaches the front cutout portion 90, the tube is directed into the sleeve 104 of the front air bag 100. The fill tube 24 is directed along the upper edge 106 of the front-air bag 100 and back into the inflatable curtain 80 along the upper edge 88 forward of the front cutout portion 90.

Figure 3B:
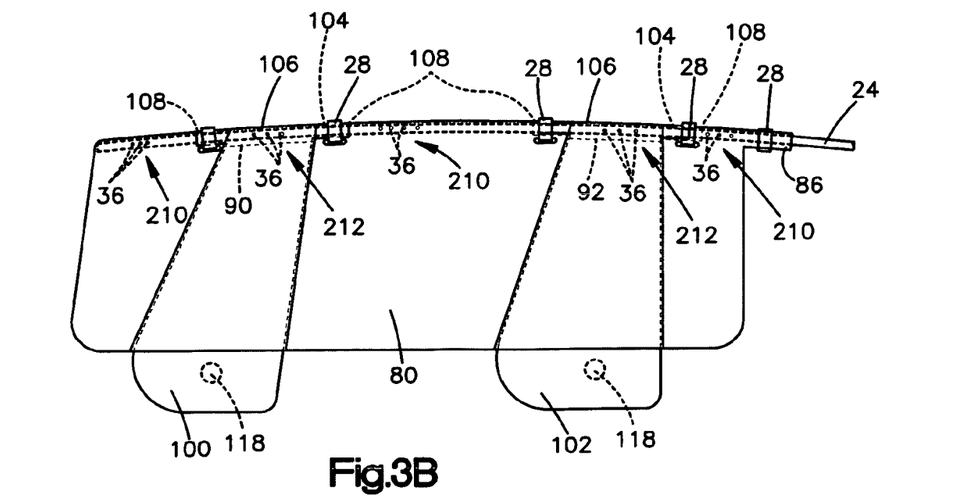
FIG. 3B illustrates the portion of FIG. 3A in an assembled condition.

Once the fill tube 24 is positioned in the inflatable curtain 80 and air bags 100 and 102, the air bag sleeves 104 are tucked into the curtain along the upper edge 88. Thereafter, means 28, such as brackets, may be used to clamp the inflatable curtain 80 and air bags 100 and 102 to the fill tube 24. The brackets 28 may also help block inflation fluid leakage through the sleeves 104 of the air bags 100 and 102 and through the cutout portions 90 and 92 of the inflatable curtain 80. With the fill tube 24 positioned in the inflatable curtain 80 and air bags 100 and 102 as shown in FIG. 3B, openings 36 in the tube are positioned in fluid communication with the inflatable chambers of the curtain and air bags. The inflatable curtain 80 and air bags 100 and 102 may then be rolled, folded, or both rolled and folded, placed in the housing 26, and installed in the vehicle 12.

As best shown in FIG. 3A, the inflatable curtain 80 includes non-inflatable portions 110 defined by connections 112 where overlying panels of the curtain are connected within the inflatable volume of the curtain. The non-inflatable portions 110 are configured and positioned to coincide with the configuration of the front and rear air bags 100 and 102. The non-inflatable portions 110 help define separate inflatable chambers 114 of the inflatable curtain 80. Fluid communication between the chambers 114 is substantially blocked. It will be appreciated, however, that the inflatable curtain 80 could be configured to provide fluid communication between the chambers 114. For example, the connections 112 could be configured to provide one or more passages (not shown) that establish fluid communication between the chambers 114. As another example, instead of being non-inflatable, the portions 110 could be configured to be inflatable with a relatively thin thickness. This could be achieved, for example, by connecting the overlying panels in a closely spaced array of points, thus giving the portions 110 a quilted configuration that permits fluid communication between the chambers 114.

The vehicle 12 includes a sensor mechanism 200 (shown schematically in FIGS. 1 and 2) for sensing the occurrence of an event for which inflation of the inflatable vehicle occupant protection device 14, i.e., the inflatable curtain 80, front air bag 100, and rear air bag 102, is desired, such as a side impact to the vehicle 12, a vehicle rollover, or both. Upon sensing the occurrence of such an event, the sensor mechanism 200 provides an electrical signal over lead wires 202 to the inflator 22. The electrical signal causes the inflator 22 to be actuated in a known manner. The inflator 22, when actuated, discharges fluid under pressure into the fill tube 24, which directs inflation fluid into the inflatable curtain 80 and air bags 100 and 102.

The inflatable curtain 80 and air bags 100 and 102 inflate under the pressure of the inflation fluid from the inflator 22. This causes the cover 26 to open, which permits the inflatable curtain 80 and air bags 100 and 102 to inflate to the position illustrated in FIG. 2. The inflatable curtain 80 and air bags 100 and 102, when inflated, are positioned between the side structure 16 and the occupants 20 of the vehicle 12.

As shown in dashed lined in FIG. 2, the inflatable vehicle occupant protection device 14 may include tethers 116 that connect the air bags 100 and 102 to the inflatable curtain 80. The tethers 110 help maintain the position of the air bags 100 and 102 relative to the inflatable curtain 80 when in the inflated condition of FIG. 2. The tethers 110 may be connected to the inflatable curtain 80 and air bags 100 and 102 in any suitable manner, such as by stitching, ultrasonic welding, heat bonding, or adhesives.

The inflatable curtain 80 and air bags 100 and 102, when inflated, help to protect the occupants 20 of the vehicle 12. The inflatable curtain 80 and air bags 100 and 102, when inflated, help absorb the energy of impacts with the air bag and help distribute the impact energy over a large area of the inflatable curtain and air bags. The inflatable curtain 80 also helps block the occupants 20, or portions thereof, from being ejected through the window openings 42 and 46.

Figure 4A:
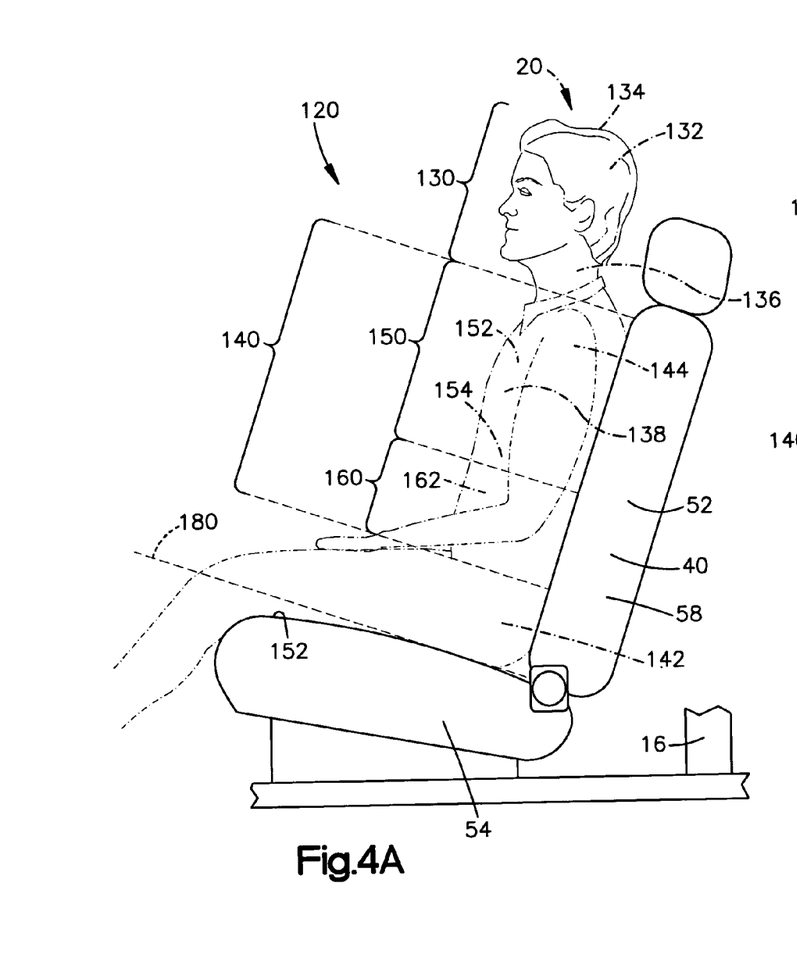
FIG. 4A is a side view illustrating occupant regions that the apparatus is intended to help protect.
Figure 4B:
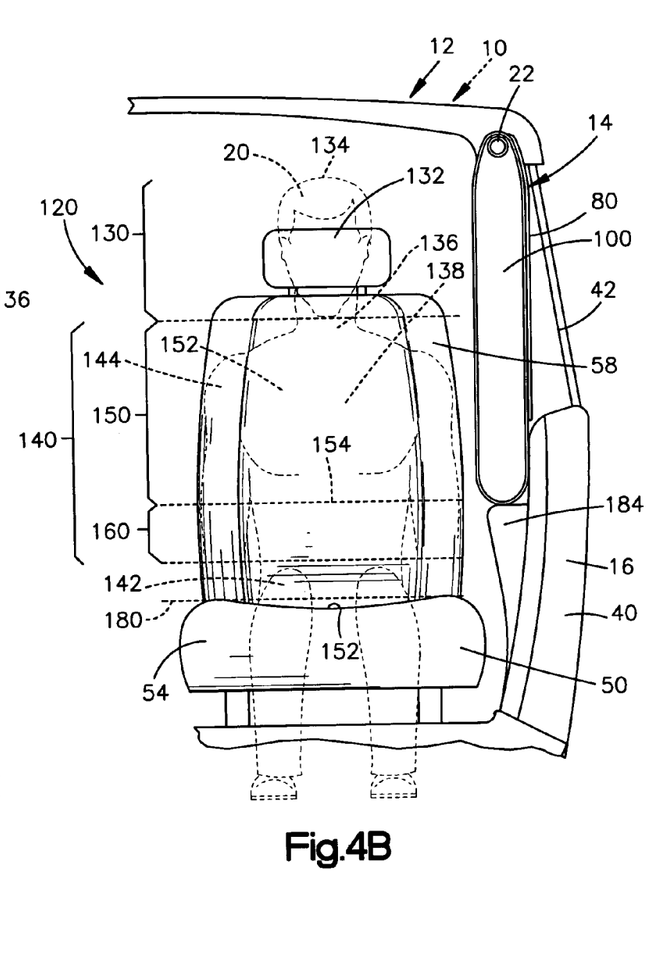
FIG. 4B is a plan view illustrating the occupant regions that the apparatus is intended to help protect.

FIGS. 4A and 4B illustrate regions 120 of the occupants 20 for which occupant protection may be desired. A head region 130 of the occupant 20 extends from the top 134 of the head 132 of the occupant down to the lower extent of the neck 136 of the occupant, i.e., where the neck meets the torso 138 of the occupant. A torso region 140 of the occupant 20 extends from the neck 136 down to the pelvis 142 of the occupant. The torso region 140 includes a thoracic region 150 that includes the thorax 152 of the occupant 20 and extends from the neck 136 down to the area of the diaphragm 154 of the occupant. The torso region 140 also includes an abdominal region 160 that includes the abdomen 162 of the occupant 20 and extends from the diaphragm 154 down to the pelvis 142 of the occupant.

The position and size of the occupant regions 120 relative to the vehicle 12 may vary depending on the size of the occupant 20. To help quantify these variances, the regions 120 of the occupants 20 may be described with reference to statistical parameters that describe the occupant's size with respect to a percentage of the general population that the apparatus 10 is intended to help protect. For example, the regions 120 may be described with reference to what is referred to as a $95^{th}$ percentile occupant. A $95^{th}$ percentile occupant has a height that is equal to or greater than 95% of the general population. A $95^{th}$ percentile occupant may, for example, be a large male occupant. The regions 120 may also be established with reference to what is referred to as a $5^{th}$ percentile occupant. A $5^{th}$ percentile occupant has a height that is equal to or greater than 5% of the general population. A $5^{th}$ percentile occupant may, for example, be a small female occupant.

The position of the occupant regions 120 relative to the vehicle 12 may also vary depending on the position of the occupant in the vehicle. This position can depend largely on the position of an adjustable vehicle seat in which the occupant is seated. The seat position may correlate to some extent with the statistical size designation for the occupant as well. For example, a $95^{th}$ percentile occupant (e.g., a tall male) would tend to use a rearward seat position of an adjustable seat. Similarly, a $5^{th}$ percentile occupant (e.g., a short female) may tend to use a forward seat position. These correlations, however, may not hold true on the passenger side of the vehicle 12. For example, a $5^{th}$ percentile occupant of the front passenger seat may position the seat rearward.

Taking these factors into account, the inflatable curtain 80 and air bags 100 and 102 are sized and configured to help protect a wide range of occupants. For example, the inflatable curtain 80 and air bags 100 and 102 may be sized and configured to help protect a range of occupants falling within the $5^{th}$ to $95^{th}$ percentiles. To do so, the inflatable curtain 80 and air bags 100 and 102 are configured to cover portions of the side structure 16 adjacent to which regions 120 of the range of occupants may be positioned.

The portions of the side structure 16 covered by the inflatable curtain 80 and air bags 100 and 102 may be identified with reference to structure of the vehicle 12. For example, the portions of the side structure 16 covered by the inflatable curtain 80 and air bags 100 and 102 may be identified with reference to the vehicle seats 50 and 52, pillars 30, 32, 34, roof 18, or a combination thereof.

The inflatable curtain 80 is configured to cover portions of the side structure 16 extending fore and aft in the vehicle 12 from adjacent or near the A pillar 30 to adjacent or near the C pillar 34. As described above, the length of the inflatable curtain 80 and the portions of the side structure 16 covered by the inflatable curtain 80 may vary.

The portions of the side structure 16 covered by the inflatable curtain 80 are selected to help absorb impact forces and to block ejection during a side impact to the vehicle 12, a vehicle rollover, or both. To achieve this function, the inflatable curtain 80 extends from the vehicle roof 18 down to adjacent or near a belt line 182 (FIGS. 1 and 2) of the vehicle 12. The belt line 182 is an imaginary line that extends adjacent or just below the side window openings 42 and 46 of the side doors 40 and 42. As best shown in FIGS. 2 and 4B, the inflatable curtain 80 when inflated is positioned between the side structure 16 and the head region 130 and between the side structure and shoulders 144 of an occupant 20.

The portions of the side structure 16 covered by the air bags 100 and 102 are selected to help absorb impact forces during a side impact to the vehicle 12, a vehicle rollover, or both. The front air bag 100 is configured to cover portions of the side structure 16 adjacent the thoracic region 150 of the occupant 20 of the front seat 50. The rear air bag 102 is configured to cover portions of the side structure 16 adjacent the thoracic region 150 of the occupant 20 of the rear seat 52.

As described above, the size and configuration of the air bags 100 and 102 takes into account the size of the occupants and the configuration of the vehicle 12. Since the front seat 50 is typically adjustable in fore and aft directions and perhaps in up, down, and tilt directions, the front air bag 100 is sized and configured to cover portions of the side structure adjacent the occupant 20 in the extremes of positions of the front seat 50.

Thus, for example, the upper extent of the front air bag 100 may be sized and configured to cover portions of the side structure 16 associated with the thoracic region 150 of a $95^{th}$ percentile occupant 20 in the highest position of the seat 50. The lower extent of the front air bag 100 may be sized and configured to cover portions of the side structure 16 associated with the thoracic region 150 of a $5^{th}$ percentile occupant 20 in the lowest position of the seat 50. The forward extent of the front air bag 100 may be sized and configured to cover portions of the side structure 16 associated with the thoracic region 150 of an occupant 20 in the forwardmost position of the seat 50. The rearward extent of the front air bag 100 may be sized and configured to cover portions of the side structure 16 adjacent the seat back 58 at the rearwardmost position of the seat 50.

If the rear seat 52 has adjustable positions, the size and configuration of the rear air bag 102 may be determined in accordance with the occupant size and seat position, as described above in regard to the front air bag 100. Depending on the particular vehicle model, however, the rear seat 52 may have a fixed position and may not be adjustable. Therefore, it will be appreciated that the size and configuration of the rear air bag 102 may be different than that of the front air bag 100.

Thus, where the position of the rear seat 52 is not adjustable, the upper extent of the rear air bag 102 may be sized and configured to cover portions of the side structure 16 associated with the thoracic region 150 of a $95^{th}$ percentile occupant 20 of the seat 52. The lower extent of the rear air bag 102 may be sized and configured to cover portions of the side structure 16 associated with the thoracic region 150 of a $5^{th}$ percentile occupant 20 of the seat 52. The forward extent of the rear air bag 102 may be sized and configured to cover portions of the side structure 16 associated with the thoracic region 150 of a $95^{th}$ percentile occupant 20 of the seat 52. The rearward extent of the rear air bag 102 may be sized and configured to cover portions of the side structure 16 adjacent the seat back 58 of the seat 52.

In addition to taking into account the occupant size, position, and regions 120 for which occupant protection is desired, the coverage of the inflatable curtain 80 and air bags 100 and 102 may also take into account the construction or architecture of the vehicle 12. As shown in FIGS. 2 and 4B, the side doors 50 and 52 may include respective arm rests 184. The positions of the arm rests 184 in the vehicle 12 relative to the occupants 20 may vary. In the embodiment illustrated in FIGS. 2 and 3B, the arm rests 184 are positioned below the belt line 182 and below the thoracic regions 150 of the occupants 20.

Those skilled in the art will appreciate that the arm rests 184 may impede deployment of the air bags 100 and 102. Therefore, as shown in FIGS. 2 and 4B, the air bags 100 and 102 may be sized and configured to extend down below the lower edge of the inflatable curtain 80 and below the belt line 182 to the arm rests 184. In this configuration, the air bags 100 and 102 cover the thoracic regions 150 of the occupants 20.

According to the present invention, the air bags 100 and 102 and the inflatable curtain 80 comprise separately inflatable chambers of the inflatable vehicle occupant protection device 14. In the assembled configuration of the apparatus 10 (see FIG. 3B), the inflatable curtain 80 is inflatable by inflation fluid directed through groups of openings 36 in the fill tube 24 identified generally at 210 in FIG. 3B. The air bags 100 and 102 are inflatable by inflation fluid directed through other groups of openings 36 in the fill tube 24 identified generally at 212 in FIG. 3B.

In the assembled condition of the apparatus 10, fluid communication between the inflatable chambers of the inflatable curtain 80 and air bags 100 and 102 is substantially blocked. Those skilled in the art will appreciate that there may be some slight or minimal degree of fluid communication between the chambers 114 of the inflatable curtain 80, the front air bag 100, and the rear air bag 102 via the fill tube 24. Any fluid communication through the fill tube 24 is, however, minimal and not significant. A side impact event has such a short duration that any appreciable flow between the curtain 80 and air bags 100 and 102 via the fill tube 24 during the side impact event is not likely to occur. Also, the relatively small differential pressures between the chambers 114 of the inflatable curtain 80 and the air bags 100 and 102, when inflated, will help minimize flow between the chambers 114 and the air bags.

The substantial blockage of fluid communication between the inflatable chambers 114 of the inflatable curtain 80 and air bags 100 and 102 is advantageous. Since a side impact event occurs relatively quickly, it is generally desirable to deploy and pressurize the air bags 100 and 102 quickly. This is because the gap or space between the side structure 16 and the thorax regions 150 of the occupants 20 (see FIG. 4B) is relatively small. It will be appreciated that this gap may close quickly as the occupants 20 move toward the side structure 16 in the event of a side impact to the vehicle 12.

For example, in the event of a side impact to the vehicle 12, the gap may close in about 25-35 milliseconds after the onset of the impact. Therefore, it may be desirable to deploy and pressurize the air bags 100 and 102 to the inflated condition of FIGS. 2 and 4B within 20-25 milliseconds after the onset of the side impact. Given that the sensor mechanism 200 takes some time to determine that a side impact has occurred (e.g., up to 10 milliseconds), once the inflator 24 is actuated, it may be desirable to deploy and pressurize the air bags 100 and 102 within about 10-25 milliseconds.

The construction of the apparatus 10 according to the present invention helps facilitate this functionality. Since fluid communication between the inflatable curtain 80 and air bags 100 and 102 is substantially blocked, the flow areas and number of apertures 36 in the groups 212 of apertures inflating the air bags 100 and 102 may be selected so as to direct inflation fluid into the air bags at a volumetric flow rate sufficient to deploy and pressurize the air bags 100 and 102 in the desired time. The flow areas and number of apertures in the groups 210 of apertures directing inflation fluid into the inflatable curtain 80 may also be selected so as to facilitate deployment of the curtain within about the same time as the air bags 100 and 102 are deployed. The inflatable curtain 80 may, however, be permitted to pressurize over a longer time. Because of this, the required size of the inflator 22 may be reduced since the fluid is directed into the separate chambers in different volumetric flow rates.

The separate inflatable chamber configuration of the inflatable curtain 80 and the air bags 100 and 102 also allows for venting inflation fluid from the air bags at a rate different than that of the inflatable curtain. For example, it may be desirable to vent inflation fluid from the air bags 100 and 102 in order to promote force dissipation, provide a smooth or less abrupt deceleration (e.g., a "ride down" effect) upon impacts with the air bags, and reduce rebound after impacts with the air bags. On the other hand, it may be desirable to avoid venting and maintain inflation and pressurization of the inflatable curtain 80 for an extended time in order to maintain the position of the curtain and tension on the curtain. As a result, the inflatable curtain 80 can help prevent ejection throughout the duration of a side impact event, a rollover event, or both.

One way to achieve these different venting rates is to construct the inflatable curtain 80 and air bags 100 and 102 with different degrees of gas permeability. For example, the air bags 100 and 102 may be uncoated and thus gas permeable in order to provide venting, whereas the inflatable curtain 80 may be coated or laminated to provide a gas-tight or substantially gas-tight construction. As an alternative, the air bags 100 and 102 could be formed with vents (e.g., openings in the air bags), shown schematically at 118 in FIGS. 2-3B. As another alternative, the inflatable curtain 80 could be coated or laminated with a material having a relatively low permeability and the air bags 100 and 102 could be coated or laminated with a material having a relatively high permeability. As a further alternative, the inflatable curtain 80 and air bags 100 and 102 could be constructed of fabrics having different permeabilities.

Once the air bags 100 and 102 are inflated and pressurized to the desired pressure, pressurization of the air bags can be maintained for a desired duration, such as 100 milliseconds or longer. This helps ensure that the air bags 100 and 102 help protect the occupants 20 throughout the duration of a side impact event. Since the air bags 100 and 102 vent inflation fluid to help protect the occupants in a side impact, the air bags may become deflated shortly after inflation. For example, the air bags 100 and 102 may be substantially deflated within 1 second after inflation.

The inflatable curtain 80, remaining pressurized for seven seconds or longer, helps protect the occupants 20 throughout an extended event, such as a rollover of the vehicle 12. The inflatable curtain 80 remains pressurized regardless of whether the air bags 100 and 102 become deflated. Therefore, the inflatable curtain 80 together with the air bags 100 and 102 can help protect vehicle occupants throughout the duration of an event, such as a side impact to the vehicle, a vehicle rollover, or both.

Figure 5A:
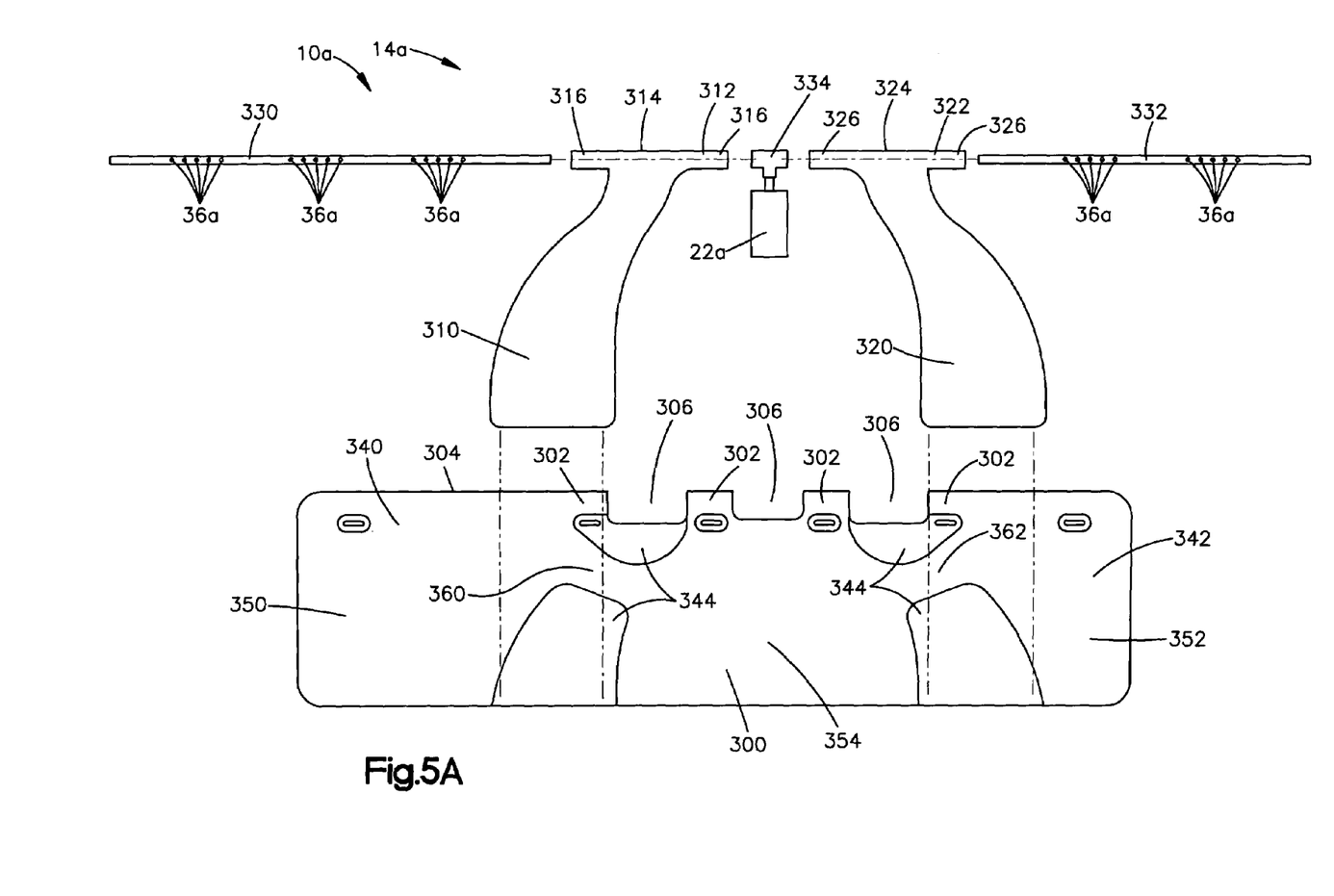
FIG. 5A is an exploded view of a portion of an apparatus for helping to protect an occupant of a vehicle, according to a second embodiment of the present invention.
Figure 5B:
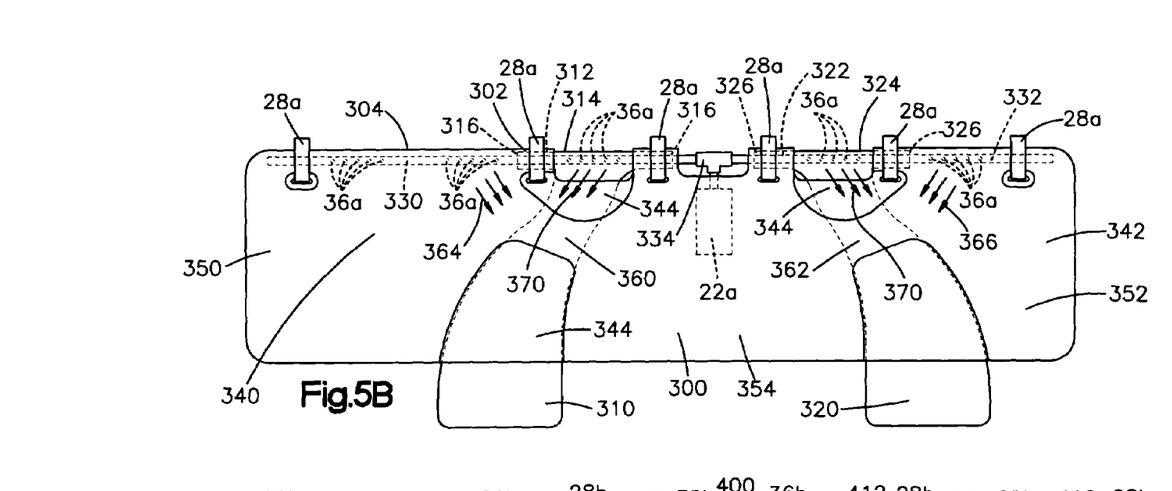
FIG. 5B is a plan view illustrating the portion of FIG. 5A in an assembled condition.

A second embodiment of the present invention is illustrated in FIGS. 5A and 5B. The second embodiment of the invention is similar to the first embodiment of the invention illustrated in FIGS. 1-4B. Accordingly, numerals similar to those of FIGS. 1-4B will be utilized in FIGS. 5A and 5B to identify similar components, the suffix letter "a" being associated with the numerals of FIGS. 5A and 5B to avoid confusion.

In the embodiment of FIGS. 5A and 5B, the apparatus 10a is configured to help protect occupants of two rows of seating in a vehicle (not shown). The coverage provided by the apparatus 10a may be similar to that of the first embodiment, as shown in FIG. 2. Those skilled in the art, however, will appreciate that the apparatus 10a may have alternative configurations. For example, the apparatus 10a may be configured to help protect occupants of a single row or more than two rows of seating in the vehicle.

The apparatus 10a includes an inflatable vehicle occupant protection device 14a. The inflatable vehicle occupant protection device 14a includes an inflatable curtain 300, a front air bag 310, and a rear air bag 320. In the embodiment illustrated in FIGS. 5A and 5B, the inflatable curtain 300 helps protect occupants of first and second rows of vehicle seating. The front and rear air bags 310 and 320 help protect occupants of single rows of seating.

The inflatable curtain 300 and air bags 310 and 320 are configured to be connected in fluid communication with front and rear fill tubes 330 and 332, respectively. The front and rear fill tubes 330 and 332 are connected in fluid communication with an inflator 22a via means 334, such as a T-fitting 334. The front fill tube 330 is for directing inflation fluid from the inflator 22a into the front air bag 310 and into a front portion 340 of the inflatable curtain 300. The rear fill tube 332 is for directing inflation fluid from the inflator 22a into the rear air bag 320 and into a rear portion 342 of the inflatable curtain 300.

The inflatable curtain 300 includes a channel or sleeve 302 that extends along an upper edge portion 304 of the curtain. The sleeve 302 is for receiving the front and rear fill tubes 330 and 332 in the inflatable curtain 300. Portions of the sleeve 302 are removed at cut out portions 306 spaced along the upper edge 304 of the inflatable curtain 300. One cutout portion 306 is positioned in the front portion 340 of the inflatable curtain 300 and coincides with a location on the front fill tube 330 where the front air bag 310 is located. Another cutout portion 306 is positioned in the rear portion 342 of the inflatable curtain 300 and coincides with a location on the rear fill tube 332 where the rear air bag 320 is located. A central cutout portion 306 coincides with a location where the T fitting 334 is positioned in an assembled condition of the apparatus 10a (FIG. 5B).

The front air bag 310 includes a channel or sleeve 312 for receiving the front fill tube 330 along an upper edge portion 314 of the front air bag. The sleeve 312 may include end portions 316 that protrude from opposite ends of the front air bag 310. The front fill tube 330 is insertable into the sleeve 312 of the front air bag 310. The front fill tube 330 extends along the upper edge portion 314 through the front bag 310 and into the sleeve 302 in the front portion 340 of the inflatable curtain 300.

The rear air bag 320 includes a channel or sleeve 322 for receiving the rear fill tube 332 along an upper edge portion 324 of the rear air bag. The sleeve 322 may include end portions 326 that protrude from opposite ends of the rear air bag 320. The rear fill tube 332 is insertable into the sleeve 322 of the rear air bag 320. The rear fill tube 332 extends along the upper edge portion 324 through the rear bag 320 and into the sleeve 302 in the rear portion 342 of the inflatable curtain 300.

Once the fill tubes 330 and 332 are positioned in their respective air bags 310 and 320 and their respective portions 340 and 342 of the inflatable curtain 300, the tubes are connected to the T fitting 334. The end portions 316 of the sleeve 312 of the front air bag 310 are tucked into the sleeve 302 of the inflatable curtain 300 at the cutout portion 306 in the front portion 340 of the curtain. The end portions 326 of the sleeve 322 of the rear air bag 320 are tucked into the sleeve 302 of the inflatable curtain 300 at the cutout portion 306 in the rear portion 342 of the curtain. Thereafter, means 28a, such as brackets, clamp the inflatable curtain 300 and front air bag 310 to the front fill tube 330. Brackets 28a also connect the inflatable curtain 300 and rear air bag 320 to the rear fill tube 332. The brackets 28a may also help block inflation fluid leakage through the sleeves 302, 312, and 322 and through the cutout portions 306 of the inflatable curtain 300.

With the fill tubes 330 and 332 positioned in the inflatable curtain 300 and air bags 310 and 320 as shown in FIG. 5B, openings 36a in the tubes are positioned in fluid communication with the inflatable chambers of the curtain and air bags. The inflatable curtain 300 and air bags 310 and 320 may then be rolled, folded, or both rolled and folded, placed in the housing (not shown), and installed in the vehicle.

The inflatable curtain 300 includes non-inflatable portions 344 where overlying panels of the curtain are connected within the inflatable volume of the curtain. Non-inflatable portions 344 located in the front portion 340 of the inflatable curtain 300 are configured and positioned to coincide with the configuration of the front air bag 310. Non-inflatable portions 344 located in the rear portion 342 of the inflatable curtain 300 are configured and positioned to coincide with the configuration of the rear air bag 320.

The non-inflatable portions 344 define inflatable chambers of the inflatable curtain 300. A front chamber 350 is positioned in the front portion 340 of the inflatable curtain 300, a rear chamber 352 is positioned in the rear portion 342 of the curtain, and a middle chamber 354 is positioned centrally in the curtain between the front and rear chambers. The chambers 350, 352, and 354 are connected in fluid communication with each other by passages 360 and 362 defined by the non-inflatable portions 344. In this configuration of the apparatus 10a, certain openings 36a in the front fill tube 330 may be configured to direct inflation fluid through the front chamber 350 and through the passage 360 into the middle chamber 354. This is indicated generally by the arrows indicated generally at 364 in FIG. 5B. Certain openings 36a in the rear fill tube 332 may be configured to direct inflation fluid through the rear chamber 352 and through the passage 362 into the middle chamber 354. This is indicated generally by the arrows indicated generally at 366 in FIG. 5B.

In the embodiment illustrated in FIGS. 5A and 5B, the front air bag 310 is inflated via openings 36a in the front fill tube 330 closest to the inflator 22a. Also, the rear air bag 320 is inflated via openings 36a in the rear fill tube 332 closest to the inflator 22a. This may help ensure that the front and rear air bags 310 and 320 are inflated to the desired pressure within the desired amount of time. One factor that may contribute to this is that the openings 36a directing inflation fluid into the air bags 310 and 320 are not subjected to any pressure drop from upstream openings.

Another factor that may contribute to this is that the air bags 310 and 320 have angled portions adjacent their respective fill tubes 330 and 332 that extend generally diagonally downward and away from the inflator 22a as viewed in FIG. 5B. In this configuration, the openings 36a of the fill tubes 330 and 332 positioned in the air bags 310 and 320 may be configured to direct inflation fluid into the air bags at angles that coincide with the angled portions of the air bags. This is indicated generally by the arrows at 370 in FIG. 5B. Directing the inflation fluid in these directions may help reduce turbulence, which may help promote inflation fluid flow into the air bags 310 and 320.

The inflatable curtain 300 and air bags 310 and 320 of the second embodiment, when inflated, help protect an occupant of a vehicle in a manner similar or identical to the first embodiment of FIGS. 1-4B. The air bags 310 and 320 help protect vehicle occupants in the event of a side impact to the vehicle and the inflatable curtain 300 helps protect the occupants in the event of a vehicle rollover. This configuration of the apparatus 10a, in which fluid communication between the inflatable curtain 300 and air bags 310 and 320 is substantially blocked, provides performance capabilities and characteristics similar or identical to those described above in regard to the first embodiment.

The separate inflatable chamber configuration of the inflatable curtain 300 and the air bags 310 and 320 also allows for venting inflation fluid from the air bags at a rate different than that of the inflatable curtain. Thus, inflation fluid may be vented from the air bags 310 and 320 in order to promote force dissipation, provide a smooth or less abrupt deceleration (e.g., a "ride down" effect) upon impacts with the air bags, and reduce rebound after impacts with the air bags. Also, venting of the inflatable curtain 300 may be avoided and inflation and pressurization may be maintained for an extended time in order to maintain the position and tensioning of the curtain. As a result, the inflatable curtain 300 can help prevent ejection throughout the duration of a side impact event, a rollover event, or both.

Once the air bags 310 and 320 are inflated and pressurized to the desired pressure, pressurization of the air bags can be maintained for a desired duration, such as 100 milliseconds or longer. This helps ensure that the air bags 310 and 320 help protect the occupants throughout the duration of a side impact event. The inflatable curtain 300, remaining pressurized for seven seconds or longer, helps protect the occupants throughout an extended event, such as a rollover of the vehicle. Therefore, the inflatable curtain 300 and air bags 310 and 320 can help protect vehicle occupants throughout the duration of an event, such as a side impact to the vehicle, a vehicle rollover, or both.

Figure 6:
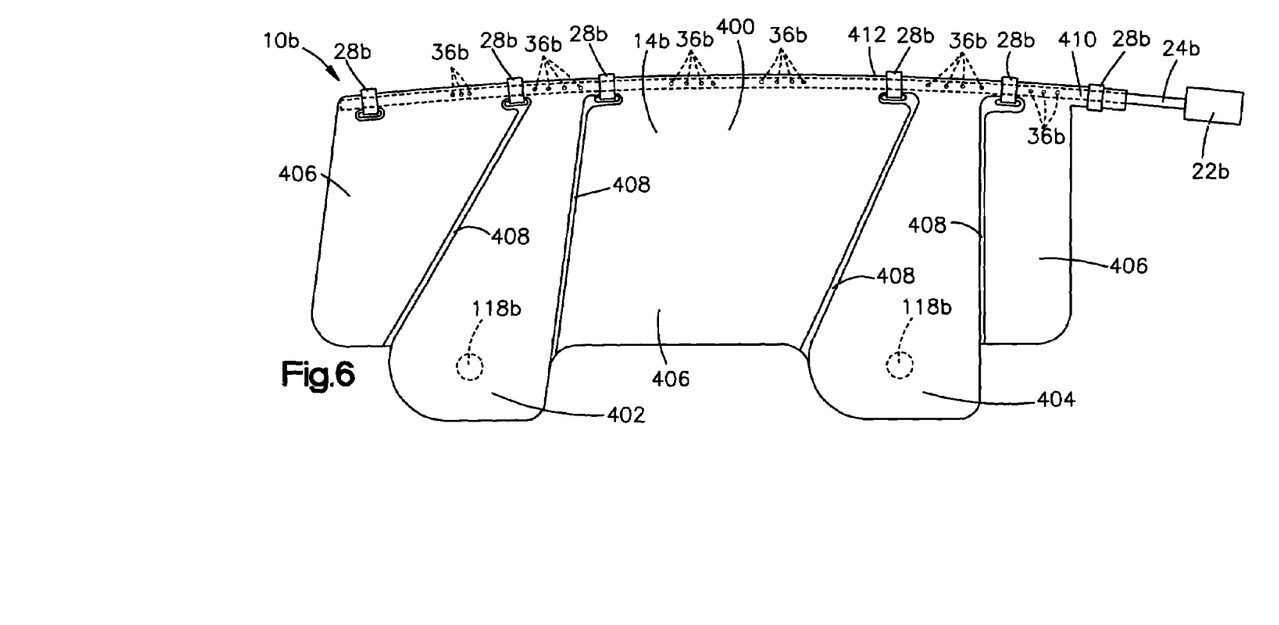
FIG. 6 is a plan view of a portion of an apparatus for helping to protect an occupant of a vehicle, according to a third embodiment of the present invention.

A third embodiment of the present invention is illustrated in FIG. 6. The third embodiment of the invention is similar to the first embodiment of the invention illustrated in FIGS. 1-4B. Accordingly, numerals similar to those of FIGS. 1-4B will be utilized in FIG. 6 to identify similar components, the suffix letter "b" being associated with the numerals of FIG. 6 to avoid confusion.

In the embodiment of FIG. 6, the apparatus 10b is configured to help protect an occupant of a first and second rows of seating in a vehicle (not shown). The coverage provided by the apparatus 10b may be similar to that of the first embodiment, as shown in FIG. 2. Those skilled in the art, however, will appreciate that the apparatus 10b may have alternative configurations. For example, the apparatus 10b may be configured to help protect occupants of a single row or more than two rows of seating in the vehicle.

The apparatus 10b includes an inflatable vehicle occupant protection device 14b. The inflatable vehicle occupant protection device 14b is an inflatable curtain 400. In the embodiment illustrated in FIG. 6, the inflatable curtain 400 includes a front thorax chamber 402, a rear thorax chamber 404 and curtain chambers 406. The front thorax chamber 402, rear thorax chamber 404, and curtain chambers 406 are at least partially defined by connections 408 where overlying panels of the curtain are connected within the inflatable volume of the curtain.

In the embodiment illustrated in FIG. 6, the inflatable curtain 400 preferably has a one piece woven construction in which single layer portions define a perimeter of the curtain and internal connections 408 of the curtain. In this configuration, the inflatable curtain 400 is constructed of a single piece of woven material. The inflatable curtain 400 could, however, have an alternative configuration. For example, the inflatable curtain 400 could be formed by stitching separate panels together along the perimeter and internal connections, or interconnecting the panels via ultrasonic welding, heat bonding, or adhesives.

The inflatable curtain 400 is configured to be connected in fluid communication with the fill tube 24b. The inflatable curtain 400 includes a channel or sleeve 410 that extends along an upper edge 412 of the curtain. The fill tube 24b is insertable in the sleeve 410. The fill tube 24b, when fully inserted in the inflatable curtain 400, extends along the upper edge 412 of the curtain. Once the fill tube 24b is positioned in the inflatable curtain 400, means 28b, such as brackets, are used to clamp the inflatable curtain 400 to the fill tube. The brackets 28b may also help block inflation fluid leakage through the sleeve 410. The inflatable curtain 400 can be rolled, folded, or both rolled and folded, placed in the housing (not shown), and installed in the vehicle.

With the fill tube 24b positioned in the inflatable curtain 400 as shown in FIG. 6, openings 36b in the tube are positioned in fluid communication with the front thorax chamber 402, the rear thorax chamber 404, and the curtain chambers 406. Upon actuation of the inflator 24b, the inflatable curtain 400 is inflated via the openings 36b in the fill tube 24b. The flow areas and number of the openings 36b directing inflation fluid into the thorax chambers 402 and 404 may be selected so as to help ensure that the thorax chambers are inflated to the desired pressure within the desired amount of time.

The inflatable curtain 400, when inflated, helps protect an occupant of a vehicle in a manner similar or identical to the embodiments of FIGS. 1-5B. The configuration of the inflatable curtain 400 in which fluid communication between the curtain chambers 406 and thorax chambers 402 and 404 is substantially blocked provides performance capabilities and characteristics similar or identical to those described above in regard to the first embodiment.

The separate inflatable chamber configuration of the inflatable curtain 400 has advantages. The required size of the inflator 22b may be reduced since the fluid is directed into the separate chambers at different volumetric flow rates.

The separate inflatable chamber configuration of the inflatable curtain 400 also allows for venting inflation fluid from the thorax chambers 402 and 404 at a rate different than that of the curtain chambers 406. Inflation fluid may be vented from the thorax chambers 402 and 404 in order to promote force dissipation, provide a smooth or less abrupt deceleration (e.g., a "ride down" effect) upon impacts with the thorax chambers, and reduce rebound after impacts with the thorax chambers. Also, venting of the curtain chambers 406 may be avoided and inflation and pressurization may be maintained for an extended time in order to maintain the position and tensioning of the curtain. As a result, the inflatable curtain 400 can help prevent ejection throughout the duration of a side impact event, a rollover event, or both.

These different degrees of venting may be achieved in a variety of manners. For example, the thorax chambers 402 and 404 of the air bag 400 may be uncoated and thus gas permeable in order to provide venting. The curtain chambers 406 of the inflatable curtain 400 may be coated or laminated to provide a gas-tight or substantially gas-tight construction. Those skilled in the art will appreciate, however, that it may be difficult or impossible to selectively coat or laminate the curtain chambers 406 and leave the thorax chambers 402 and 404 uncoated. This depends on the particular coating or laminating machines and processes employed in the manufacture of the inflatable curtain 400. For this reason, it may be desirable (e.g., time and cost effective) to coat or laminate the entire inflatable curtain 400 and provide vents 118b (e.g., openings) in the thorax chambers 402 and 404.

Once the thorax chambers 402 and 404 are inflated and pressurized to the desired pressure, pressurization of the thorax chambers can be maintained for a desired duration, such as 100 milliseconds or longer. This helps ensure that the thorax chambers 402 and 404 remain inflated to the desired pressure throughout the duration of a side impact event. The curtain chambers 406, remaining pressurized for seven seconds or longer, help protect the occupants throughout an extended event, such as a rollover of the vehicle. Therefore, the inflatable curtain 400 can help protect vehicle occupants throughout the duration of an event, such as a side impact to the vehicle, a vehicle rollover, or both.

Figure 7A:
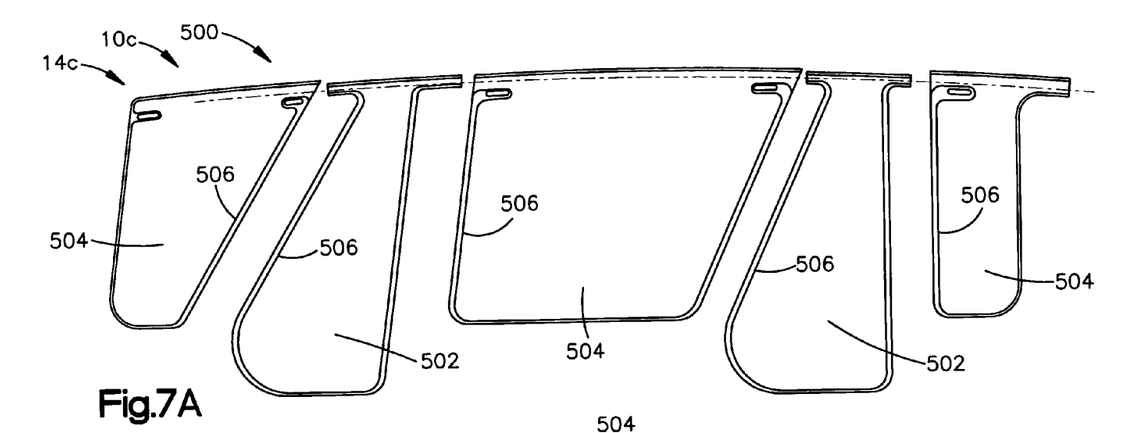
FIG. 7A is an exploded view of a portion of an apparatus for helping to protect an occupant of a vehicle, according to a fourth embodiment of the present invention.
Figure 7B:
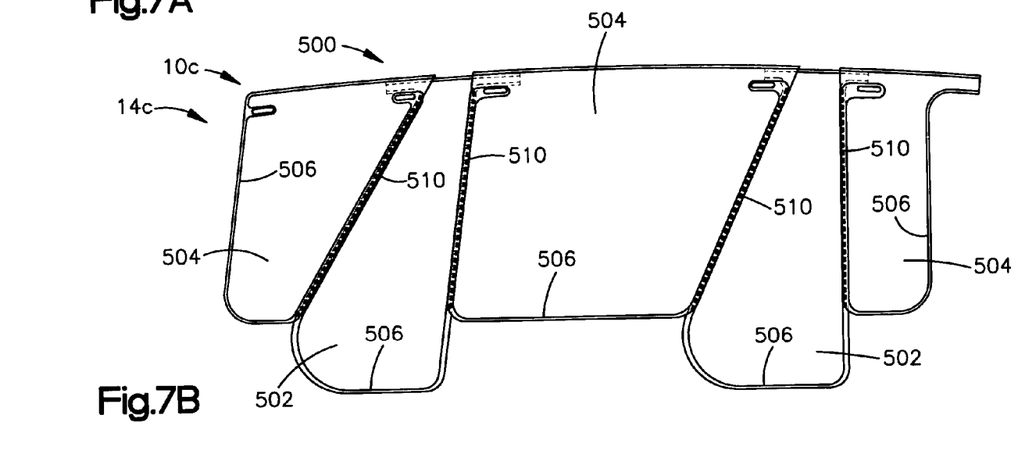
FIG. 7B is a plan view illustrating the portion of FIG. 7A in an assembled condition.

A fourth embodiment of the present invention is illustrated in FIGS. 7A and 7B. The fourth embodiment of the invention is similar to the third embodiment of the invention illustrated in FIG. 6. Accordingly, numerals similar to those of FIG. 6 will be utilized in FIGS. 7A and 7B to identify similar components, the suffix letter "c" being associated with the numerals of FIGS. 7A and 7B to avoid confusion.

In the embodiment of FIGS. 7A and 7B, the apparatus 10c is configured to help protect an occupant of a first and second rows of seating in a vehicle (not shown). The coverage provided by the apparatus 10c may be similar to that of the first embodiment, as shown in FIG. 2. Those skilled in the art, however, will appreciate that the apparatus 10c may have alternative configurations. For example, the apparatus 10c may be configured to help protect occupants of a single row or more than two rows of seating in the vehicle.

The apparatus 10c includes an inflatable vehicle occupant protection device 14c. The inflatable vehicle occupant protection device 14c is an inflatable curtain 500. In the embodiment illustrated in FIGS. 7A and 7B, the inflatable curtain 500 includes thorax chambers 502 and curtain chambers 504. As shown in FIG. 7A, the thorax chambers 502 and curtain chambers 504 are separate inflatable portions that are sewn together or otherwise connected to form the inflatable curtain as shown in FIG. 7B.

The thorax chambers 502 and curtain chambers 504 may be formed in a variety of manners. For example, the chambers 502 and 504 may have a one piece woven construction or may be formed from separate panels of material that are interconnected by means such as stitching, ultrasonic welding, heat bonding, or adhesives. Non-inflatable peripheral portions 506 of adjacent chambers 502 and 504 are then positioned in an overlying relationship and interconnected by means such as stitching, ultrasonic welding, heat bonding, or adhesives. In FIG. 7B, stitch lines interconnecting the chambers 502 and 504 are indicated generally at 510.

Constructing the chambers 502 and 504 separately and then interconnecting them to form the inflatable curtain 500 is advantageous because this allows the chambers to be selectively coated, laminated, or otherwise sealed. The thorax chambers 502 may thus be configured to have a gas permeability different than the gas permeability of the curtain chambers 504. This may be especially helpful in a situation where the available coating or laminating facilities do not allow for the selective coating or lamination of the chambers 502 and 504 of a single piece inflatable curtain 500.

The chambers 502 and 504 may be formed as separate pieces in a variety of manners. For example, the inflatable curtain 500 may be formed with a one piece woven construction and the chambers 502 and 504 may then be cut apart along the non-inflatable portions. As another example, the individual chambers 502 and 504 may be produced in mass as a sheet, cut from the sheet, the curtain chambers 504 coated, laminated, or otherwise sealed, and the chambers interconnected to form the inflatable curtain 500.

The inflatable curtain 500, once assembled, is similar or identical to the inflatable curtain 400 of the third embodiment of FIG. 6. The inflatable curtain 500 thus may help protect occupants of a vehicle in a manner similar or identical to that described above in regard to the embodiment of FIG. 6.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle having a side structure and a roof, said apparatus comprising:
   a first portion comprising at least one inflatable chamber, said first portion being inflatable away from the vehicle roof between the side structure of the vehicle and a vehicle occupant;
   a second portion comprising at least one inflatable chamber, said second portion being inflatable away from the vehicle roof between the side structure of the vehicle and a vehicle occupant, said second portion when inflated extending below said first portion and adjacent a thorax of a vehicle occupant when inflated, fluid communication between said chambers of said first and second portions being substantially blocked; and
   a fill tube for delivering inflation fluid into said first portion and said second portion, said fill tube extending through upper end portions of said first and said second portions positioned along the vehicle roof.

2. The apparatus recited in claim 1, wherein said second portion overlies said first portion.

3. The apparatus recited in claim 2, wherein said second portion is positioned between said first portion and the vehicle occupant.

4. The apparatus recited in claim 1, further comprising an inflation fluid source, said first and second portions being in fluid communication with said inflation fluid source.

5. The apparatus recited in claim 1, wherein said first portion when inflated extends from adjacent the vehicle roof to adjacent a belt line of the vehicle.

6. The apparatus recited in claim 1, wherein said second portion when inflated extends down to adjacent an arm rest of the vehicle.

7. The apparatus recited in claim 1, wherein said first and second portions comprise separate inflatable vehicle occupant protection devices.

8. The apparatus recited in claim 1, wherein said first portion has a substantially gas impermeable construction and said second portion has a construction enabling venting of inflation fluid from said second portion.

9. An apparatus for helping to protect an occupant of a vehicle having a side structure and a roof, said apparatus comprising:
   a first portion comprising at least one inflatable chamber, said first portion being inflatable away from the vehicle roof between the side structure of the vehicle and a vehicle occupant; and
   a second portion comprising at least one inflatable chamber, said second portion being inflatable away from the vehicle roof between the side structure of the vehicle and a vehicle occupant, said second portion when inflated extending below said first portion and adjacent a thorax of a vehicle occupant when inflated, fluid communication between said chambers of said first and second portions being substantially blocked, wherein said first portion is constructed to remain inflated and pressurized to at least a predetermined pressure for at least seven seconds.

10. The apparatus recited in claim 1, wherein said second portion comprises means for enabling venting of inflation fluid from said at least one chamber of said second portion.

11. The apparatus recited in claim 1, wherein said first portion is constructed of woven panels that include one of a substantially gas impermeable coating or a substantially gas impermeable lamination that blocks fluid leakage through the panels.

12. The apparatus recited in claim 1, wherein said second portion is adapted to inflate and pressurize more rapidly than said first portion.

13. The apparatus recited in claim 1, wherein said first portion comprises an inflatable curtain for helping to protect an occupant in a vehicle rollover and said second portion comprises an air bag for helping to protect an occupant in a vehicle side impact.

14. The apparatus recited in claim 13, wherein said inflatable curtain is inflatable between the vehicle side structure and said air bag, and said air bag is inflatable between said inflatable curtain and the vehicle occupant.

15. The apparatus recited in claim 13, wherein said fill tube has at least one portion positioned in said inflatable curtain and at least one portion positioned in said air bag.

16. The apparatus recited in claim 15, wherein said at least one portion of said fill tube positioned in said air bag is configured to direct inflation fluid into said air bag portion at a flow rate sufficient to deploy and pressurize said air bag more rapidly than said inflatable curtain.

17. The apparatus recited in claim 15, wherein said at least one portion of said fill tube positioned in said air bag is upstream from said at least one portion of said fill tube positioned in said inflatable curtain.

18. The apparatus recited in claim 1, wherein said first and second portions comprise different inflatable chambers of an inflatable curtain, said inflatable curtain being free of passages for providing fluid communication between said first and second portions.

19. The apparatus recited in claim 18, wherein said first portion comprises curtain chambers of said inflatable curtain and said second portion comprises thorax chambers of said inflatable curtain.

20. The apparatus recited in claim 18, wherein said inflatable curtain has a one piece woven construction.

21. An apparatus for helping to protect an occupant of a vehicle having a side structure and a roof, said apparatus comprising:
   a first portion comprising at least one inflatable chamber, said first portion being inflatable away from the vehicle roof between the side structure of the vehicle and a vehicle occupant; and
   a second portion comprising at least one inflatable chamber, said second portion being inflatable away from the vehicle roof between the side structure of the vehicle and a vehicle occupant, said second portion when inflated extending below said first portion and adjacent a thorax of a vehicle occupant when inflated, fluid communication between said chambers of said first and second portions being substantially blocked, wherein said second portion is constructed to enable inflation fluid to vent from said second portion more rapidly than from said first portion.

22. The apparatus recited in claim 1, said fill tube including at least one first group of openings for directing inflation fluid directly into said at least one chamber of said first portion, said fill tube including at least one second group of openings for directing inflation fluid directly into said at least one chamber of said second portion.

23. Apparatus for helping to protect an occupant of a vehicle that has a side structure and a roof, said apparatus comprising:
an inflatable curtain that is inflatable away from the vehicle roof to a deployed position between the side structure of the vehicle and a vehicle occupant; and
an inflation fluid source for inflating said inflatable curtain;
said inflatable curtain comprising a thorax portion inflatable adjacent a thorax of the vehicle occupant, said thorax portion when inflated bisecting and extending below remaining portions of said inflatable curtain, said thorax portion being inflatable more rapidly than other portions of said inflatable curtain.

24. The apparatus recited in claim 23, wherein said thorax portion comprises at least one inflatable chamber in fluid communication with said inflation fluid source, said at least one inflatable chamber being substantially blocked from fluid communication with said remaining portions of said inflatable curtain.

25. The apparatus recited in claim 23, wherein said inflatable curtain has a one piece woven construction.

26. Apparatus for helping to protect an occupant of a vehicle that has a side structure and a roof, said apparatus comprising:
an inflatable curtain that is inflatable away from the vehicle roof to a deployed position between the side structure of the vehicle and a vehicle occupant; and
an inflation fluid source for inflating said inflatable curtain;
said inflatable curtain comprising a thorax portion inflatable adjacent a thorax of the vehicle occupant, said thorax portion when inflated extending below remaining portions of said inflatable curtain, said thorax portion being inflatable more rapidly than other portions of said inflatable curtain, wherein said inflation fluid is vented from said thorax portion more rapidly than from said remaining portions of said inflatable curtain.

27. An apparatus for helping to protect an occupant of a vehicle that has a side structure and a roof, said apparatus comprising:
an inflatable curtain including at least one inflatable chamber, said inflatable curtain being inflatable away from the vehicle roof between the side structure of the vehicle and a vehicle occupant; and
an air bag including at least one inflatable chamber, said air bag being inflatable away from the vehicle roof to a position between the side structure of the vehicle and a vehicle occupant, wherein said air bag when inflated overlies a non-inflatable portion of said inflatable curtain and is free from overlying inflatable portions of said inflatable curtain.

28. The inflatable vehicle occupant protection device recited in claim 27, wherein fluid communication between said inflatable curtain and said air bag is substantially blocked.

29. The inflatable vehicle occupant protection device recited in claim 27, wherein said fill tube has at least one portion positioned in said inflatable curtain and at least one portion positioned in said air bag.

30. An apparatus for helping to protect an occupant of a vehicle during a side impact to the vehicle and during a vehicle rollover, the vehicle having a side structure and a roof, said apparatus comprising:
a first portion actuatable away from the vehicle roof and between the side structure of the vehicle and a vehicle occupant to help protect the vehicle occupant for at least five seconds during a vehicle rollover; and
a second portion for helping to protect an occupant in a vehicle side impact comprising at least one inflatable chamber, said second portion being inflatable away from the vehicle roof between the side structure of the vehicle and a vehicle occupant, said second portion when inflated extending adjacent a thorax of a vehicle occupant, said second portion being inflated and deflated within one second.

31. The inflatable vehicle occupant protection device recited in claim 30, further comprising a fill tube for delivering inflation fluid to said first and second portions.

* * * * *